(12) United States Patent
Fischer

(10) Patent No.: US 12,311,867 B2
(45) Date of Patent: May 27, 2025

(54) FRONT AIRBAG

(71) Applicant: ZF AUTOMOTIVE GERMANY GMBH, Alfdorf (DE)

(72) Inventor: Christian Fischer, Plüderhausen (DE)

(73) Assignee: ZF AUTOMOTIVE GERMANY GMBH, Alfdorf (DE)

( * ) Notice: Subject to any disclaimer, the term of this patent is extended or adjusted under 35 U.S.C. 154(b) by 0 days.

(21) Appl. No.: 17/614,612

(22) PCT Filed: May 27, 2020

(86) PCT No.: PCT/EP2020/064638
§ 371 (c)(1),
(2) Date: Nov. 29, 2021

(87) PCT Pub. No.: WO2020/239802
PCT Pub. Date: Dec. 3, 2020

(65) Prior Publication Data
US 2022/0227329 A1 Jul. 21, 2022

(30) Foreign Application Priority Data
May 29, 2019 (DE) .......................... 102019114410.8

(51) Int. Cl.
*B60R 21/2338* (2011.01)

(52) U.S. Cl.
CPC *B60R 21/2338* (2013.01); *B60R 2021/23382* (2013.01)

(58) Field of Classification Search
CPC ................. B60R 21/2338; B60R 2021/23382
See application file for complete search history.

(56) References Cited

U.S. PATENT DOCUMENTS

| | | | | |
|---|---|---|---|---|
| 7,793,976 B2 * | 9/2010 | Kuroe | ............... | B60R 21/231 |
| | | | | 280/743.2 |
| 7,845,681 B2 * | 12/2010 | Abe | ............... | B60R 21/239 |
| | | | | 280/736 |
| 8,322,748 B2 * | 12/2012 | Abe | ............... | B60R 21/2338 |
| | | | | 280/739 |

(Continued)

FOREIGN PATENT DOCUMENTS

| | | |
|---|---|---|
| DE | 102016113254 A1 | 1/2018 |
| JP | 20070055501 A | 3/2007 |
| KR | 101766834 B1 * 8/2017 ........... B60R 21/205 |

OTHER PUBLICATIONS

KR-101766834-B1 (machine translation) (Year: 2017).*

(Continued)

*Primary Examiner* — Jason D Shanske
*Assistant Examiner* — Joselynn Y Sliteris
(74) *Attorney, Agent, or Firm* — Tarolli, Sundheim, Covell & Tummino LLP

(57) ABSTRACT

A front airbag (10) includes an inflatable chamber (18) having a baffle surface (16) provided to cushion an occupant (14) to be restrained, wherein a tether (28) extending inside the inflatable chamber (18) is provided which, when the front airbag (10) is mounted on the vehicle and is inflated, extends obliquely with respect to a vehicle longitudinal direction (L) and which is fastened with a first longitudinal end (34) to a single baffle surface-side fastening point (30) at the baffle surface (16).

9 Claims, 1 Drawing Sheet

(56) References Cited

U.S. PATENT DOCUMENTS

| | | | |
|---|---|---|---|
| 8,419,054 B2* | 4/2013 | Abe | B60R 21/239 |
| | | | 280/739 |
| 9,187,055 B1 | 11/2015 | Genthikatti et al. | |
| 9,434,344 B2* | 9/2016 | Fukawatase | B60R 21/2338 |
| 10,053,043 B2* | 8/2018 | Miura | B60R 21/239 |
| 10,214,175 B2* | 2/2019 | Kobayashi | B60R 21/231 |
| 2010/0102542 A1* | 4/2010 | Nakajima | B60R 21/233 |
| | | | 280/743.2 |
| 2016/0207490 A1 | 7/2016 | Yamada et al. | |
| 2017/0166159 A1 | 6/2017 | Shin | |
| 2018/0111581 A1 | 4/2018 | Wang et al. | |

OTHER PUBLICATIONS

PCT International Search Report for corresponding International Serial No. PCT/EP2020/064638, mailed Jul. 2, 2020, pp. 1-4.
Federal Register / vol. 88, No. 172 / Thursday, Sep. 7, 2023 / Proposed Rules.

\* cited by examiner

FRONT AIRBAG

RELATED APPLICATIONS

This application is a U.S. National Stage Application filed under 35 USC 371, claiming priority to Serial No. PCT/EP2020/064638, filed on 27 May 2020; which claims priority from German Patent Application DE 10 2019 114 410.8, filed 29 May 2019, the entireties of which are hereby incorporated herein by reference.

TECHNICAL FIELD

The invention relates to a front airbag and to a vehicle comprising a front airbag.

BACKGROUND

Front airbags in vehicle occupant restraint systems serve for the protection of the occupants seated on the front seats of a vehicle and cushion the occupant in the event of an abrupt vehicle deceleration. Front airbags are known for airbag modules in the steering wheel and on the passenger side, for example in an instrument panel there.

A front face of the front airbag is usually configured as a baffle surface which cushions the occupant. The arrangement of the baffle surface is usually optimized for a pure frontal impact without any lateral force component. The front airbag is intended, however, to offer proper protection for the occupant even for others types of a collision, of course.

A front airbag having an improved restraining effect is known from DE 10 2016 113 254 A1, for example. This front airbag has an internal tether which is guided starting from the rear wall of the airbag remote from the occupant to the front wall of the airbag. On the rear wall, the tether is fastened relatively centrally in the vicinity of the inflation orifice. Closely to the front wall serving as baffle surface, the tether divides into two sections stitched with the front wall.

SUMMARY

It is the object of the invention to provide a front airbag that offers an improved restraining effect in particular in the case of a laterally offset frontal impact and has a simple constructional design, in particular can be easily manufactured.

This object is achieved by a front airbag comprising the features of claim 1. The front airbag includes an inflatable chamber which has a baffle surface provided to cushion an occupant to be restrained. There is provided a tether extending inside the inflatable chamber, the tether extending, when the front airbag is mounted on the vehicle and is inflated, obliquely with respect to a vehicle longitudinal direction and being fastened with a first longitudinal end to a single baffle surface-side fastening point on the baffle surface.

In the event of an offset or inclined impact, the tether produces a torque which partially counteracts inadvertent rotation of the head of the occupant when the latter impacts on the baffle surface. This results in less angular acceleration and less angular speed of the head.

The lateral component of the head movement results in an imbalance of the fabric tensions on both sides of the head. This entails a torque. An additional compensating torque is produced by adding the tether in the impacting area of the head.

In the inflated state of the front airbag, the tether forms a small trough in the baffle surface, which results in a more uniform contact of the head of the occupant in the vehicle transverse direction on both sides of the tether.

The baffle surface-side fastening point of the tether is preferably located, when the front airbag is mounted on the vehicle and is inflated, in a central area of the baffle surface with respect to a vehicle transverse direction. In this way, a rotation of the occupant's head can be reduced.

Moreover, the baffle surface-side fastening point should be disposed at an upper area of the baffle surface provided for an impact of the occupant's head. In the ideal case, the fastening point of the tether is located directly at the point where the occupant's head is cushioned by the baffle surface.

In this application, the baffle surface is understood to be a section of a wall of the front airbag. An outer face of the baffle surface faces the occupant, while an oppositely directed inner face points into the inflatable chamber. The tether is fixed, for example sewn with the wall, from the inside.

Laterally acting forces can be compensated particularly well when the tether extends as closely as possible to the transverse direction of the vehicle across the chamber of the front airbag. Of preference, the tether therefore encloses, when the front airbag is mounted on the vehicle and is inflated, an angle ranging from 50° to 80°, in particular from 60° to 70°, with the vehicle longitudinal direction.

A second longitudinal end of the tether is preferably fastened to a lateral wall of the front airbag to realize an as large angle of the tether as possible with the vehicle longitudinal direction. It has turned out to be sufficient to provide only one single fastening point on the wall of the front airbag for the second longitudinal end of the tether. However, the fastening point of the second longitudinal end of the tether should be away from the baffle surface in an area in which the occupant usually does not come into contact with the front airbag.

Thus, in the inflated state of the front airbag, the fastening point of the second longitudinal end of the tether is also preferably located at a distance from an inflation orifice of the front airbag or a housing of an airbag module which accommodates the front airbag in the folded state.

It has turned out to be advantageous when the tether extends at least approximately in parallel to a vehicle vertical direction and extends to be inclined in a plane spanned by the longitudinal direction and the transverse direction of the vehicle. In this way, the forces introduced by the impact of the occupant's head into the front airbag can be absorbed not only punctually but over a larger distance by the tether, thus improving the restraining effect.

The fastening point at each of the two longitudinal ends of the tether preferably extends over the entire height of the tether so that both longitudinal ends are tightly connected to the wall of the front airbag over said entire distance.

A dimension of the tether along the vehicle vertical direction is larger than 20 cm and is preferably larger than an average height of an occupant's head, for example, and may range from about 20 cm to 40 cm, for example.

The tether is made from the same fabric, for example, that is also used for the wall of the front airbag, and is then flexible but not elastic.

As a rule, the tether remains tightly connected to the front airbag during the entire restraining operation at the entire expansion of its fastening points and preferably does not change its length, either.

The invention also relates to a vehicle comprising an afore-described front airbag. During normal driving, the front airbag is preferably accommodated, as conventionally known, in a housing of an airbag module. The airbag module is usually disposed in the front area of a passenger compartment and may be mounted in a steering wheel or in an instrument panel, for example.

BRIEF DESCRIPTION OF THE DRAWINGS

In the following, the invention will be described in detail by way of an embodiment with reference to the attached figures, wherein.

DESCRIPTION

Figure 2:
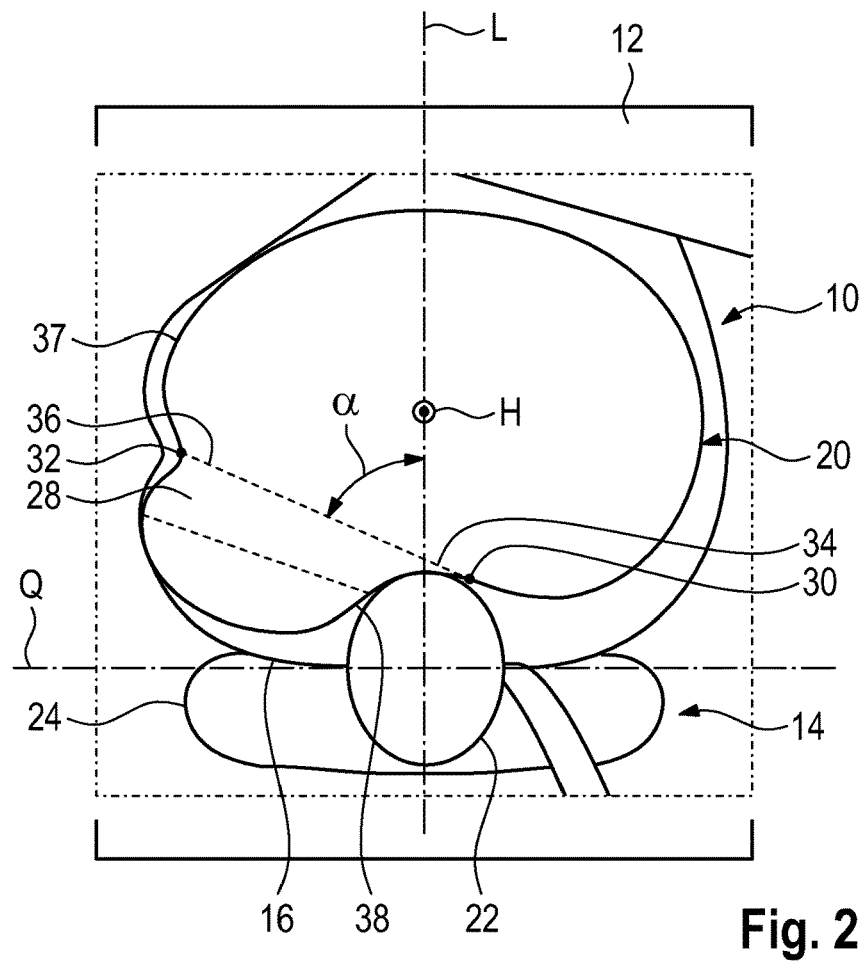
FIG. 2 shows a schematic top view of the front airbag from FIG. 1 in the fully inflated and vehicle-mounted state.

The Figures illustrate a front airbag 10 which is mounted as passenger or driver airbag in a vehicle 12 schematically indicated in FIG. 2. Both Figures illustrate the front airbag 10 in the completely inflated state. In FIG. 2, the front airbag 10 is shown in the position mounted on the vehicle 12 which the front airbag 10 adopts in a situation of restraint shortly before or while an occupant 14 immerses into the front airbag 10.

On its side directed to the occupant 14, the inflated front airbag 10 has a baffle surface 16 provided for contacting the occupant 14.

In the embodiment shown here, the front airbag 10 is made of a single inflatable chamber 18 that is delimited by an airbag wall 20 made from a known flexible airbag fabric. The baffle surface 16 is part of the wall 20.

Figure 1:
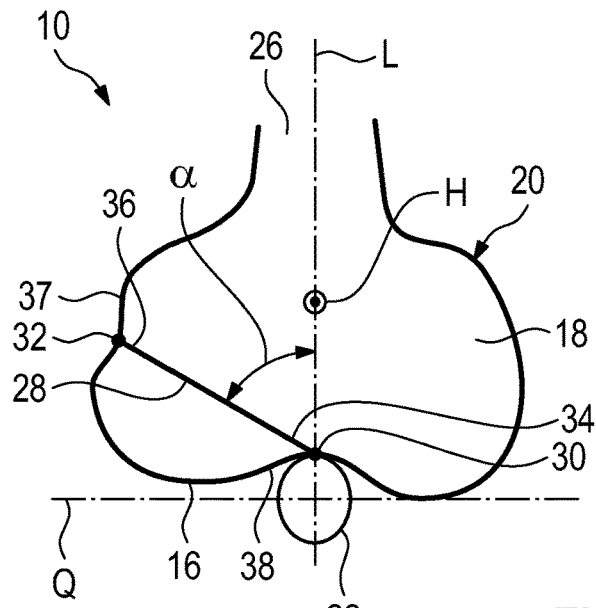
FIG. 1 shows a schematic sectional view of a front airbag according to the invention in the fully inflated state in a plane spanned by the longitudinal direction and the transverse direction of a vehicle.

FIG. 1 illustrates a section across the front airbag 10 along a plane that is spanned by a longitudinal direction L and a transverse direction Q of the vehicle 12. As is evident from the drawing, the baffle surface 16 extends in the area in which a head 22 of the occupant 14 impacts on the front airbag 10 approximately in parallel to the transverse direction Q.

A vehicle vertical direction H is perpendicular to the longitudinal direction L and the transverse direction Q. The baffle surface 16 has such a large expansion along the vehicle vertical direction H that it extends at least from a torso 24 to above the head 22 of the occupant 14.

The baffle surface 16 is approximately opposed to an inflation orifice 26 through which filling gas is introduced to the front airbag 10, if the latter is to be inflated in a situation of restraint (see FIG. 1). The front airbag 10 is fastened to the inflation orifice 26 in an airbag module (not shown) that is mounted affixed to the vehicle, for example in an instrument panel or a steering wheel of the vehicle 12.

Inside the inflatable chamber 18, a tether 28 extending from a baffle surface-side fastening point 30 to a wall-side fastening point 32 is disposed.

A first longitudinal end 34 of the tether 28 is tightly fastened, such as stitched, to the baffle surface-side fastening point 30 at the inside of the baffle surface 16.

Based on the vehicle transverse direction Q, the baffle surface-side fastening point 30 is located approximately in the middle of the baffle surface 16 here.

A second longitudinal end 36 of the tether 28 is tightly fastened, for example also by stitching, to the wall-side fastening point 32 on a lateral wall 37 that is part of the wall 20 of the front airbag 10. The lateral wall 37 in this case extends from an edge of the baffle surface 16 to the inflation orifice 26. In this case, the wall-side fastening point 32 is located definitely at a distance from the inflation orifice 26, however.

In the top view along the vehicle vertical direction H, the tether 28 extends obliquely with respect to the longitudinal direction L and the transverse direction Q. An as large angle α as possible with the longitudinal direction L is selected which ranges from 50° to 80° and especially from 50° to 70°, for example.

The length of the tether 28 is dimensioned so that the tether 28 is tensioned in the inflated front airbag 10 so strongly that a small trough 38 is formed in the baffle surface 16 at the first fastening point 30.

The tether 28 extends into the image plane of the Figures along the vehicle vertical direction H over a distance of about more than 20 cm to 40 cm and especially over a distance that is larger than the height of the head 22 of the occupant 14.

As a matter of course, the tether 28 could also be inclined by several degrees vis-à-vis the vehicle vertical direction H without its function being impaired.

Both the baffle surface-side fastening point 30 and the wall-side fastening point 32 extend over the entire height of the tether 28 along the vehicle vertical direction H.

The tether 28 in this case extends along the vehicle vertical direction H mainly in the area where the head 22 of the occupant 14 (standardized to the head of a standard dummy) impacts on the baffle surface 16.

At the first fastening point 30, the tether 28 exerts a force with a lateral component upon the baffle surface 16. This results in a lateral force acting on the head 22 when the latter impacts on the baffle surface 16 so that a rotation of the head 22 of the occupant 14 is reduced, if a laterally offset impact which entails a force component in the transverse direction Q upon the vehicle 12 occurs in a situation of restraint.

During the entire situation of restraint, the tether 28 always remains tightly connected to the baffle surface 16 and the wall 20 at both fastening points 30, 32 and does not change its position.

The invention claimed is:

1. A front airbag for a vehicle, comprising an inflatable chamber and including a flexible airbag fabric forming a wall with a portion comprising a baffle surface provided to cushion an occupant to be restrained, the front airbag comprising opposing lateral walls that define lateral bounds of the front airbag, with the baffle surface extending across the width of the front airbag from one of the lateral walls to the other of the lateral walls, wherein a single tether extending inside the inflatable chamber is provided which, when the front airbag is mounted on the vehicle and is inflated, extends obliquely with respect to a vehicle longitudinal direction and has a first longitudinal end fastened to the baffle surface at a first fastening point that is located, when the front airbag is mounted on the vehicle and is inflated, in a central area of the baffle surface relating to a vehicle transverse direction and centrally between the lateral walls, wherein a second longitudinal end of the tether is fastened to one of the lateral walls at a second fastening point and is free from connections to the other of the lateral walls, and wherein a width dimension of the tether extending along a vehicle vertical direction is configured to be larger than a height of an average occupant's head and larger than 20 cm so that the tether, when tensioned due to inflation of the front airbag, forms a trough that extends along the first fastening point vertically in the baffle surface with a height corresponding to the width dimension of the tether, wherein the airbag is free from additional tethers connected to the baffle surface.

2. The front airbag according to claim 1, wherein, when the front airbag is mounted on the vehicle and is inflated, the tether encloses an angle ranging from 50° to 80° with the vehicle longitudinal direction.

3. The front airbag according to claim 1, wherein the tether extends approximately in parallel to a vehicle vertical direction and extends inclined in a plane spanned by the longitudinal and transverse directions of the vehicle.

4. A vehicle comprising the front airbag according to claim 1.

5. The front airbag according to claim 1, wherein, when the front airbag is mounted on the vehicle and is inflated, the tether encloses an angle ranging from 60° to 70° with the vehicle longitudinal direction.

6. The front airbag according to claim 1, wherein the tether is connected to the front airbag at the first fastening point along the entire width dimension of the tether so that the trough has the height that corresponds to the width dimension of the tether.

7. The front airbag according to claim 1, wherein the trough is centered widthwise along the first fastening point.

8. The front airbag according to claim 1, wherein the tether, being singular and connected to the one of the lateral walls, is configured to exert a force with a lateral component on the baffle surface, and to produce a lateral force acting on the head when the head impacts the baffle surface so that rotation of the head is reduced.

9. The front airbag according to claim 1, wherein the trough is configured, when the front airbag is mounted on the vehicle and is inflated, to be centered with respect to an inflation fluid orifice of the front airbag through which inflation fluid is directed into the inflatable chamber.

* * * * *